United States Patent [19]
Sianesi et al.

[11] 3,755,235
[45] Aug. 28, 1973

[54] POLYTETRAFLUOROETHYLENE EMULSIONS HAVING IMPROVED PROPERTIES

[75] Inventors: Dario Sianesi, Milan; Giancarlo Bernardi, Canzo; Gianfranco Veroli, San Donato Milanese, all of Italy

[73] Assignee: Montecatini Edison S.p.A., Milan, Italy

[22] Filed: Jan. 5, 1971

[21] Appl. No.: 104,122

[30] Foreign Application Priority Data
Jan. 9, 1970 Italy.............................. 19183 A/70

[52] U.S. Cl.. 260/29.6 F, 117/161 R, 260/29.6 ME
[51] Int. Cl. ............................................. C08f 45/24
[58] Field of Search ............... 260/29.6 F, 29.6 ME, 260/92.1

[56] References Cited
UNITED STATES PATENTS
2,965,595  12/1960  Brinker et al. ................. 260/29.6 F
3,271,341  9/1966  Garrison....................... 260/29.6 F
3,535,301  10/1970  Gropell et al. ................. 260/29.6 F
3,513,203  5/1970  Sianesi et al...................... 260/594

Primary Examiner—Harold D. Anderson
Attorney—Hubbell, Cohen & Thubbell and Cohen & Stiefel

[57] ABSTRACT

Stabilized polytetrafluoroethylene emulsions particularly suitable for protective coating applications are produced by adding, to emulsions obtained from conventional emulsion polymerization of tetrafluoroethylene, a perfluoroketoether compound. The resulting emulsions are much more resistant to coagulation than are untreated emulsions when subjected to agitation or contacted with ionic materials such as acids and salts. More desirable coatings than heretofore possible, that are less subject to yellow discoloration occurring in conventional coatings and capable of being cast at greater thickness (of up to about 40 microns) without carcking, are obtained therewith.

Concentrated polytetrafluoroethylene emulsions are produced by adding ionic material to the foregoing stabilized emulsions.

13 Claims, No Drawings

POLYTETRAFLUOROETHYLENE EMULSIONS HAVING IMPROVED PROPERTIES

BACKGROUND OF THE INVENTION

1. Field of the Invention

The present invention relates to aqueous polytetrafluoroethylene (PTFE) emulsions having improved properties, these emulsions having been modified by the addition of specific agents having the structure of a perfluoroketoether.

Aqueous polytetrafluoroethylene emulsions have important applications in industry and technology, especially in protective coating processes (protective varnishes, adhering films, etc.), see H.M. Whitcut, Plastic Progress, 1955, page 103-127.

2. Description of the Prior Art

The emulsions obtained directly from the polymerization of tetrafluoroethylene in an aqueous medium and in the presence of surfactants as described, for example, in U.S. Pat. Nos. 2,559,752 and 2,612,484 have poor stability both to the application of mechanical energy and to ionic agents such as acids and salts.

Since it is preferable for technical reasons to use, in the protective coating processes, more concentrated emulsions than those obtainable directly from the polymerization of tetrafluoroethylene, these emulsions are presently concentrated by means of electrodecantation (see for example H.M. Whitcut, Plastic Progress, 1955, page 103-127). Such concentration processes, however, are long and costly. Moreover, they require the use of a high percentage of non-fluorinated surface active agents which have a thermal stability less than that of polytetrafluoroethylene, and thus impart thermal instability and a tendency toward discoloration to the coatings obtained with those emulsions.

The polytetrafluoroethylene emulsions obtained directly from the polymerization of tetrafluoroethylene as well as those concentrated subsequently by means of electrodecantation yield good coatings having a thickness of only a few microns, for example about 5 microns. However, when an attempt is made to obtain, in one operation, single coating having a thickness greater than a few (about 5) microns, the coating cracks. Thicker coatings which are not cracked can be obtained only by applying to the surface to be covered repeated layers of emulsion and by sintering each layer separately.

SUMMARY OF THE INVENTION

The present invention provides polytetrafluoroethylene emulsions which exhibit much greater stability to mechanical energy and to ionic agents than that shown by the polytetrafluoroethylene emulsions known heretofore.

The present invention also provides concentrated polytetrafluoroethylene emulsions by a method which is much simpler and less expensive than electrodecantation, which method does not require the use of non-fluorinated surfactants.

The present invention also provides polytetrafluoroethylene emulsions that can be employed to obtain, in one single coating operation, coatings of high thickness, from about 10 to about 40 microns, and having an excellent appearance.

The foregoing features of the present invention are achieved by adding, to an aqueous PFTE emulsion obtained by emulsion polymerization of tetrafluoroethylene, compounds which contain only carbon, fluorine and oxygen, and which have the structure of perfluoroketoethers.

More particularly, the present invention provides aqueous polytetrafluoroethylene emulsions containing at least one perfluoroketoether of the formula:

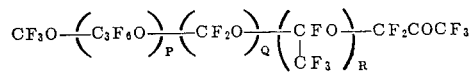

wherein:

$C_3F_6O$ is a perfluoroalkylene unit derived from the opening of the double bond of a molecule of hexafluoropropylene and has the structure

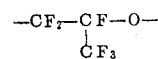

P is either zero or an integer from 1 to 5;
each of Q and R is either zero or an integer from 1 to 2; and the sum of (P+Q+R) is either zero or an integer from 1 to 7.

The present invention also provides a process for the concentration of aqueous polytetrafluoroethylene emulsions by adding an ionic agent to an aqueous polytetrafluoroethylene emulsion of the present invention, i.e., one containing a perfluoroketoether.

DESCRIPTION OF THE PREFERRED EMBODIMENTS

The polytetrafluoroethylene emulsions of the present invention may contain either one of the foregoing perfluoroketoethers or a mixture of several of these perfluoroketoether compounds. These compounds have been described, for example, in U.S. Pat. No. 3,513,203 and in U.S. Pat. application Ser. No. 24,371, a divisional thereof, now U.S. Pat. 3,683,027.

The perfluoroketoethers exert their activity as surfactants, stabilizing the polytetrafluoroethylene emulsions in accordance with the present invention, although to a minor degree, even when they are used in amounts of $1 \times 10^{-3}$ mole per 100 g of polymer. There seems to be no upper limit to the amount of perfluoroketoether which may be used in accordance with the present invention other than the limit suggested by economical considerations. From this viewpoint, the upper limit of perfluoroketoether might be indicated as 0.1 mole per 100 grams of polymer. Nevertheless, it will be understood that greater amounts, although not always economically convenient, can be advantageously used in carrying out the present invention. A preferred range for the amount of perfluoroketoether, in that it has been found to afford excellent results, is between about $5 \times 10^{-3}$ and $60 \times 10^{-3}$ mole per 100 grams of polymer.

The addition of perfluoroketoether to the polytetrafluoroethylene can be carried out in different ways, although the preferred way of carrying out this addition comprises preliminarily dispersing the perfluoroketoether or the mixture of perfluoroketoethers in water under vigorous stirring and then admixing the resulting solution or dispersion with the polymer emulsion under gentle stirring.

A first effect of admixing said perfluoroketoethers with the polytetrafluoroethylene emulsions is that of considerably increasing the stability of said emulsions to coagulation caused by the actions of mechanical energy. For instance, emulsions obtained directly from polymerization and which have a polymer content of 10–18 percent by weight (g of polymer/100 g of emulsion) become non-coagulable even under vigorous stirring when perfluoroketoethers are added thereto. By contrast, when the same emulsions, without the addition of perfluoroketoethers, are subjected to stirring, a complete separation of the polymer occurs within a few minutes. Similarly, the same emulsions, not treated with perfluoroketoethers, coagulate upon the addition of ionic compounds such as acids or salts.

On the other hand, the emulsions treated with perfluoroketoethers in accordance with this invention show a different and surprising behavior when ionic agents are added thereto. In fact, there takes place therein a stratification with the separation of an upper clear aqueous layer wherein the polymer is practically absent, and a lower layer consisting of a more concentrated polymer emulsion that can contain even more than 66 g of polymer per 100 g of emulsion. This behavior, and the exceptional resistance to coagulation by ionic agents of the emulsions of this invention, can be utilized to obtain concentrated polytetrafluoroethylene emulsions in quite a unique and inexpensive way.

Thus, in one aspect of the present invention, there is provided a process for the concentration of aqueous polytetrafluoroethylene emulsions by adding an ionic agent to an aqueous polytetrafluoroethylene emulsion which has been stabilized in accordance with the present invention by the addition thereto of a perfluoroketoether. The best and most advantageous results have been achieved when operating with amounts of perfluoroketoether between about $5 \times 10^{-3}$ and $30 \times 10^{-3}$ mole per 100 g of polymer and with amounts of ionic agent between about 0.01 and 6 moles per liter of starting emulsion. Examples of suitable ionic agents include HCl, NaCl, NH$_4$Cl, NaNO$_3$, NH$_4$NO$_3$, CdSO$_4$, and Th(NO$_3$)$_4$.

In contrast with the previously used concentration processes, for example electrodecantation, the above described method provides concentrated polytetrafluoroethylene emulsions that contain only fluorinated agents, thus obtaining quite evident advantages with respect to the thermal stability and the coloring of the end products obtained from such emulsions, as compared to the stability and the yellowish coloring which occurs in the prior art emulsions as a result of the large amounts of conventional non-fluorinated surfactants necessarily contained therein.

The aqueous perfluoroketoether- containing polytetrafluoroethylene emulsions of this invention which have a high polymer content (higher than 20% by weight), said emulsions being obtained by the above described process or by means of a conventional concentration process, such as electrodecantation, can be used for obtaining surface coatings by applying said emulsions to a support by a conventional method (e.g., spraying, brush, pad, dipping, etc.), and then sintering the polymer thus deposited on the surface to be covered.

The use of the concentrated emulsions of the present invention makes possible the obtention of coatings which are free of cracks and which at the same time are much thicker than those obtainable with concentrated emulsions produced by prior art methods. For instance, it is possible to obtain coatings with a thickness of up to about 40 microns with the concentrated emulsions of the present invention, while, in general, concentrated emulsions obtained by other methods and not containing perfluoroketoethers can form satisfactory coatings of a thickness no greater than about 5 microns.

Moreover, as already indicated, the coatings obtained with the emulsions of this invention, which contain perfluoroketoethers, have not been found to present any problems with respect to discoloration, and have better transparency and gloss and better tensile strength and elongation at break characteristics than coatings obtained with the prior art polytetrafluoroethylene emulsions. When a smooth and glossy surface, for instance metal, glass, ceramics, or enamel, is used as a support for the coating, the coating can be separated easily, thus yielding films having excellent optical and dielectric properties. This film casting process can be carried out in a continuous manner, according to conventional film casting methods, as described for example in Fred W. Billmeyer, Textbook of Polymer Science, (1962), Interscience Publishers, N.Y., 494.

The following examples are presented to further illustrate the invention without thereby limiting the scope thereof.

EXAMPLE 1

Two liters of a polytetrafluoroethylene emulsion obtained directly from the emulsion polymerization of tetrafluoroethylene and having a polymer content of 140 g per liter of emulsion (13 percent by weight of polymer based on the weight of the emulsion), were placed in a 10 liter cylindrical vessel. In a separate vessel, there was prepared, under vigorous stirring, a dispersion of 11.9 g of

in 100 ml of distilled water.

This dispersion was poured into the polymer emulsion, which was maintained under constant stirring by a 4-blade stirrer revolving at 50 rev. per min.

When the addition of the perfluoroketoether dispersion was completed, the speed of the stirrer was increased to 600 r.p.m. After 5 hours of stirring, the polymer emulsion did not show any sign of coagulation.

EXAMPLE 2

Example 1 was repeated, using 23.8 g of the same perfluoroketoether. After 5 hours of stirring at 600 r.p.m., no sign of coagulation could be observed.

EXAMPLE 3

Example 1 was repeated without introducing a perfluoroketoether into the emulsion. After 11 minutes of stirring, the polymer was completely coagulated.

EXAMPLE 4

30 ml of concentrated (37.5 percent by weight) HCl were added to one liter of a 13 percent by weight polytetrafluoroethylene emulsion stabilized with

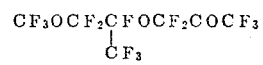

prepared as described in Example 2. After gentle stirring for three minutes, the thus treated emulsion was put into a separatory funnel. In the funnel, a separation of the emulsion into two layers occurred, the upper layer being a clear, transparent liquid, and the lower layer containing all of the polymer. The volume of said two layers changes progressively, the lower layer decreasing gradually as its solids content increases while the upper layer increases simultaneously. After 96 hours, there were separated 220 ml of concentrated polymer emulsion and 780 ml of a clear aqueous solution.

The concentrated emulsion thus obtained was subjected to stirring with a 4-blade stirrer revolving at 600 r.p.m. After 4 hours of stirring, the emulsion did not show any sign of coagulation.

The polytetrafluoroethylene content of the concentrated emulsion was 47.5% by weight (647 g of polymer per liter of concentrated emulsion).

EXAMPLE 5

Example 4 was repeated but without introducing perfluoroketoethers into the emulsion (that is, using an emulsion prepared as described in Example 3). The addition of HCl caused an intermediate coagulation of the emulsion.

EXAMPLE 6

For this example a mixture of perfluoroketoethers having the following composition was used:

| | Mol percent |
|---|---|
| $CF_3OCF_2COCF_3$ | 5.98 |
| $CF_3OCF_2CFOCF_2COCF_3$<br>  \|<br>  $CF_3$ | 34.77 |
| $CF_3OCF_2OCF_2CFOCF_2COCF_3$<br>  \|<br>  $CF_3$ | 5.20 |
| $CF_3OCFOCF_2CFOCF_2COCF_3$<br>  \|　　　　\|<br>  $CF_3$　　$CF_3$ | 6.59 |
| $CF_3O(C_3F_6O)_2CF_2COCF_3$ | 25.86 |
| $CF_3O(CF_2O)(C_3F_6O)_2CF_2COCF_3$ | 3.50 |
| $CF_3O(CFO)(C_3F_6O)_2CF_2COCF_3$<br>  \|<br>  $CF_3$ | 4.60 |
| $CF_3O(C_3F_6O)_3CF_2COCF_3$ | 9.57 |
| $CF_3O(CF_2O)(C_3F_6O)_3CF_2COCF_3$ | 0.47 |
| $CF_3O(CFO)(C_3F_6O)_3CF_2COCF_3$<br>  \|<br>  $CF_3$ | 1.00 |
| $CF_3O(C_3F_6O)_4CF_2COCF_3$ | 1.46 |
| $CF_3O(C_3F_6O)_5CF_2COCF_3$ | 1.00 |

Into 100 ml of a polytetrafluoroethylene emulsion, obtained directly from the polymerization and having a polymer content of 140 g/l (13% by weight), there were first poured 0.36 g of the above mixture of perfluoroketoethers dispersed in 10 ml of $H_2O$, and then, after one hour, 15 ml of concentrated aqueous HCl (37.5 percent by weight).

After gentle stirring for 5 minutes, the mixture was allowed to seperate progressively into two layers, one consisting of the more concentrated emulsion, containing substantially all of the polymer, and the other layer consisting of a clear aqueous liquid.

After 24 hours, the volume of the concentrated emulsion was 31 ml. Its polymer content amounted to 36.1 percent by weight (453 g/l).

EXAMPLE 7

Example 6 was repeated, using the same products in the same amounts, except that 45 ml of concentrated HCl (37.5 wt percent) was employed. After 24 hours, the volume of the concentrated emulsion, containing substantially all of the polymer, was 25 ml. Its polymer content amounted to 42 percent by weight (560 g/l).

EXAMPLE 8

Example 6 was repeated under the same conditions except that in place of the 15 ml of concentrated HCl there were used 41 ml of an aqueous NaCl solution containing 10.6 g of NaCl.

After 24 hours, the volume of the concentrated polymer emulsion that separated amounted to 21.5 ml. Its polymer content was 47.8 percent by weight (650 g/l).

EXAMPLE 9

Example 8 was repeated, but using a greater amount of the above mixture of perfluoroketoethers, i.e., 1.44 g. After 24 hours, the volume of concentrated emulsion containing substantially all of the polymer amounted to 22 ml. Its polymer content was 47 percent by weight (635 g/l).

EXAMPLE 10

To one liter of an aqueous polytetrafluoroethylene emulsion, obtained directly from the polymerization and having a polymer content of 15 percent by weight, there were added 3.92 g of the mixture of perfluoroketoethers described in Example 6 dispersed in 100 ml of distilled water, and then a solution obtained by dissolving 100 g of NaCl in 400 ml of $H_2O$.

After gentle stirring for ten minutes, the mixture was allowed to stand for 70 hours. There was thus formed a lower layer consisting of a concentrated polytetrafluoroethylene emulsion having a polymer content of 48 percent by weight. This emulsion, after separation from the upper aqueous layer, was introduced into a spray gun and sprayed onto an aluminum plate. This plate was then allowed to dry in the open air and subsequently put into an oven for 5 minutes at 380°C. Thereafter, the polymer appeared as a transparent film adhering to the aluminum plate and having an average thickness of 20 microns. Under microscopic examination, this film appeared to be free of cracks and perforations.

EXAMPLE 11

The starting aqueous polytetrafluoroethylene emulsion of Example 10 (15 percent by weight of polymer) was sprayed onto an aluminum plate and then sintered at 380° C using the same procedure as for the concentrated emulsion of Example 10. The starting emulsion, thus treated, did not yield a coherent film.

EXAMPLE 12

In this example there was used a mixture of perfluoroketoethers having the following composition:

| | Mol % |
|---|---|
| $CF_3OCF_2COCF_3$ | 5.10 |
| $CF_3OCF_2CFOCF_2COCF_3$<br>  \|<br>  $CF_3$ | 32.73 |
| $CF_3O(C_3F_6O)_2CF_2COCF_3$ | 21.04 |
| $CF_3O(C_3F_6O)_3CF_2COCF_3$ | 9.84 |
| $CF_3O(C_3F_6O)_4CF_2COCF_3$ | 2.39 |

The remaining 28.9 percent consisted of similar perfluoroketoethers, containing in the molecule, besides the $C_3F_6O$ repeating units (from 1 to 4), also —$CF_2O$— groups and/or $$-CFO-$$
$$\phantom{-}CF_3$$

groups.

This mixture was obtained by operating in the manner described in U.S. Pat. No. 3,513,203. The average molecular weight of the mixture was 509.

7.85 g of this mixture were then dispersed, under vigorous stirring, in 50 ml of distilled water, and subsequently were admixed with 1 liter of a polytetrafluoroethylene emulsion obtained directly from the polymerization, the emulsion having a polymer content of 15 percent by weight. To this emulsion were then added, under gentle stirring, 10 g of NH₄Cl dissolved in 50 ml of distilled water.

By allowing the mixture thus obtained to stand, there took place a separation into layers. After 17 hours, the lower layer, consisting of the concentrated polytetrafluoroethylene emulsion, and having a polymer content of 13 percent by weight, was separated from the upper aqueous layer.

This concentrated emulsion was applied by spray gun onto an aluminum plate. After drying in the open air and sintering over a Bunsen flame, the deposited polymer formed a transparent, colorless coating free of cracks and perforations and having a thickness of 20 microns. Another portion of the concentrated emulsion was sprayed by a spray gun onto an aluminum plate. After drying in the air, there was sprayed onto the unsintered coating thus obtained some more concentrated emulsion, thereby obtaining a second layer of coating.

After further drying in the air and sintering over the Bunsen flame, the polymer formed a continuous, transparent, colorless coating free of cracks and perforations, and had a thickness of 40 microns.

Another portion of concentrated emulsion was spread over an aluminum plate by means of a pad. After drying in the air and sintering over the flame, the polymer formed a transparent, continuous coating free of cracks and perforations.

Still another portion of emulsion was sprayed by spray-gun onto a chromium plated steel plate. After drying in the air and sintering in an oven at 380° C for 10 minutes, the polymer formed a transparent, colorless film free of cracks and perforations, not adhering to the metal support and having a thickness of 20 microns.

EXAMPLE 13

To 1 liter of polytetrafluoroethylene emulsion containing 15% by weight of polymer there were added 16.90 g of

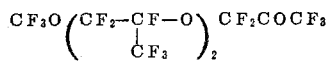

dispersed in 100 ml of H₂O.

36.8 g of a solution of NH₄Cl containing 9.6 g of NH₄Cl were added to the thus treated emulsion under gentle stirring. After 41 hours, there was obtained by stratification a concentrated polytetrafluoroethylene emulsion containing 31 percent by weight of polymer. This concentrated emulsion, by spreading on an aluminum plate by a spray gun, then drying in an oven at 80°C and direct sintering on an oxidizing Bunsen flame, produced transparent coatings free of cracks and having a thickness of about 10 microns.

EXAMPLE 14

By following precisely the procedure of Example 13, but allowing the treated emulsion to stand for 113 hours, there was produced a concentrated emulsion containing 66.5 percent by weight of polymer. This concentrated emulsion, sprayed, dried and sintered according to the same procedure as that set forth in Example 13, yielded a coating of 12 microns thickness, free of cracks, perforations or discoloring.

EXAMPLE 15

Into 300 go of polytetrafluoroethylene emulsion containing 60 percent by weight of polymer (a commercial Montedison product known as D-60), obtained by electrodecantation, there were poured 5.08 g of

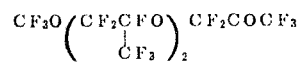

dispersed in 55 g of H₂O. This emulsion, now having a polymer content of 50 percent by weight, was allowed to stand for 3 days. The thus treated emulsion was then sprayed on an aluminum plate according to the procedure used in Example 13. After drying in the open air and sintering on a direct oxidizing Bunsen flame, there were obtained coatings of good transparency, free of cracks and perforations, and having a thickness of from 18 to 20 microns.

EXAMPLE 16

Example 15 was repeated, except that 3.58 g of

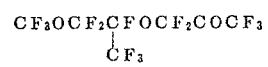

dispersed in 56.42 g of H₂O was used as the perfluoroketoether. There were obtained transparent coatings, free of cracks and perforations, having a thickness of 10 microns.

EXAMPLE 17

Into 300 g of the same aqueous polytetrafluoroethylene emulsion as that used in Example 15, there were poured, under gentle stirring, 4.71 g of the perfluoroketoether mixture described in Example 6, dispersed in 45.29 g of water.

The mixture thus obtained, allowed to stand for 4 days and then sprayed onto aluminum plates according to the conventional procedure, after drying and sintering, provided transparent coatings having a thickness of 40 microns, which were free of cracks.

EXAMPLE 18

The polytetrafluoroethylene emulsion obtained by electrodecantation and used in Examples 15, 16 and 17, to which no perfluoroketoether was added, when sprayed with the conventional procedures, was found to provide coatings free of cracks only for thicknesses up to 4 or 5 microns.

EXAMPLE 19

In this example there was used a mixture of perfluoroketoethers of the following molar composition:

| | Mol percent |
|---|---|
| $CF_3OCF_2COCF_3$ | 0.38 |
| $CF_3OCF_2CFOCF_2COCF_3$<br>         $|$<br>         $CF_3$ | 24.33 |
| $CF_3OCF_2OCF_2CFOCF_2COCF_3$<br>                 $|$<br>                 $CF_3$ | 5.04 |
| $CF_3OCFOCF_2CFOCF_2COCF_3$<br>    $|$            $|$<br>    $CF_3$       $CF_3$ | 6.01 |
| $CF_3O(CF_2CFO)_2CF_2COCF_3$<br>           $|$<br>           $CF_3$ | 31.78 |
| $CF_3O(CF_2O)(CF_2CFO)_2CF_2COCF_3$<br>                    $|$<br>                      $CF_3$ | 4.10 |
| $CF_3O(CFO)(CF_2CFO)_2CF_2COCF_3$<br>      $|$              $|$<br>      $CF_3$       $CF_3$ | 6.08 |
| $CF_3O(CF_2CFO)_3CF_2COCF_3$<br>           $|$<br>           $CF_3$ | 16.58 |
| $CF_3O(CF_2O)(CF_2CFO)_3CF_2COCF_3$<br>                    $|$<br>                      $CF_3$ | 1.23 |
| $CF_3O(CFO)(CF_2CFO)_3CF_2COCF_3$<br>      $|$              $|$<br>      $CF_3$       $CF_3$ | 1.69 |
| $CF_3O(CF_2CFO)_4CF_2COCF_3$<br>           $|$<br>           $CF_3$ | 2.78 |

4.5 g of this mixture, dispersed under vigorous stirring in 50 ml of $H_2O$, were added to 500 ml of a polytetrafluoroethylene emulsion obtained directly from the polymerization and having a polymer concentration of 10 percent by weight.

Under gentle stirring, there were then added 18.5 g of an $NH_4Cl$ solution (containing 5 g of $NH_4Cl$). Upon standing, a layer separation took place in this mixture. After 15 hours, a lower layer consisting of a concentrated emulsion having a polymer content of 33 percent by weight was recovered.

This emulsion, sprayed with a spray gun, and then dried and sintered according to the procedure used in Example 13, provided transparent and colorless coatings free of cracks and perforations, and having a thickness of 28 microns.

EXAMPLE 20

In this example there was used a mixture of perfluoroketoethers having the following molar composition:

| | Mol percent |
|---|---|
| $CF_3OCF_2COCF_3$ | 6.72 |
| $CF_3OCF_2OCF_2COCF_3$ | 0.90 |
| $CF_3OCFOCF_2COCF_3$<br>      $|$<br>      $CF_3$ | 2.10 |
| $CF_3OCF_2CFOCF_2COCF_3$<br>            $|$<br>            $CF_3$ | 28.28 |
| $CF_3OCF_2OCF_2CFOCF_2COCF_3$<br>                   $|$<br>                   $CF_3$ | 3.24 |
| $CF_3OCFOCF_2CFOCF_2COCF_3$<br>    $|$            $|$<br>    $CF_3$       $CF_3$ | 9.71 |
| $CF_3O(CF_2CFO)_2CF_2COCF_3$<br>           $|$<br>           $CF_3$ | 24.41 |
| $CF_3O(CF_2O)(CF_2CFO)_2CF_2COCF_3$<br>                    $|$<br>                      $CF_3$ | 2.10 |
| $CF_3O(CFO)(CF_2CFO)_2CF_2COCF_3$<br>      $|$              $|$<br>      $CF_3$       $CF_3$ | 6.29 |
| $CF_3O(CF_2CFO)_3CF_2COCF_3$<br>           $|$<br>           $CF_3$ | 11.87 |
| $CF_3O(CF_2O)(CF_2CFO)_3CF_2COCF_3$<br>                    $|$<br>                      $CF_3$ | 0.56 |
| $CF_3O(CFO)(CF_2CFO)_3CF_2COCF_3$<br>      $|$              $|$<br>      $CF_3$       $CF_3$ | 1.70 |
| $CF_3O(CF_2CFO)_4CF_2COCF_3$<br>           $|$<br>           $CF_3$ | 2.12 |

1.96 g of this mixture, dispersed under vigorous stirring in 50 ml of $H_2O$, were added to 500 ml of an aqueous polytetrafluoroethylene emulsion having a polymer content of 10 percent by weight.

By using the procedure described in Example 19, there was obtained, after 17 hours of standing, an emulsion having a concentration of 27.3 percent by weight. This emulsion, when sprayed with a spray-gun according to the procedure of Example 13, provided transparent and colorless coatings, free of cracks and perforations, which had a thickness of 18 microns.

EXAMPLE 21

11.76 g of the mixture of perfluoroketoethers used in Example 20, preliminarily dispersed under vigorous stirring in 50 ml of $H_2O$, were added to 500 ml of a polytetrafluoroethylene emulsion having a dry polymer content of 10 percent by weight.

After the addition to this mixture of 18.5 g of an aqueous solution containing 5 g of $NH_4Cl$ and after 17 hours of standing, there was obtained an emulsion having a concentration of 31 percent by weight. This emulsion, when sprayed with a spray gun according to the procedure described in Example 13, provided transparent coatings free of cracks and perforations and having a thickness of 30 microns.

EXAMPLE 22

Into a 750 ml flask there were poured 300 grams of a polytetrafluoroethylene emulsion obtained directly from the polymerization and having a polymer content of 10 percent by weight. To this emulsion were then added 7.42 g of the perfluoroketoether mixture described in Example 20, well dispersed by vigorous stirring in 42.6 g of water. The whole mixture was then subjected to stirring at 600 r.p.m. After 4 hours of stirring, the polymer emulsion did not show any sign of coagulation.

EXAMPLE 23

Example 22 was repeated except that there were used 14.12 g of the mixture of perfluoroketoethers described in Example 20, well dispersed in 35.9 g of water. After 5 hours of stirring, the emulsion did not show any sign of coagulation.

EXAMPLE 24

A comparative test with respect to Examples 22 and 23 was carried out in the absence of perfluoroketoethers. 300 g of emulsion (10 percent by weight), having 50 g of water added thereto, coagulated completely after 7 minutes of stirring at 600 r.p.m.

EXAMPLES 25 – 30

To 500 ml of a polytetrafluoroethylene emulsion obtained directly from the polymerization and having a polymer content of 10 percent by weight were added under gentle stirring 5.64 g of $CF_3O(C_3F_6O)_2CF_2COCF_3$, preliminarily dispersed under stirring in 44.36 g of $H_2O$. From this mixture there were drawn six portions of 45 ml each of the modified emulsion thus obtained, and to each portion there was added an electrolyte as indicated in Table 1, and thereupon there was added distilled water to bring the volume of each portion to 50 ml.

After three minutes of stirring, each of these portions was allowed to stand for 100 hours. During this period of time, there occurred the separation of concentrated polytetrafluoroethylene emulsions. The concentrations achieved are recorded in Table 1.

TABLE 1

| Electrolyte Formula | grams | Final concentration of emulsion (% by weight) |
|---|---|---|
| $NaNO_3$ | 1.07 | 37 |
| $NaNo_3$ | 0.71 | 31 |
| $NH_4NO_3$ | 1.01 | 36 |
| $NH_4NO_3$ | 0.67 | 34 |
| $3CdSO_4 \cdot 8H_2O$ | 3.24 | 31 |
| $3CdSO_4 \cdot 8H_2O$ | 2.16 | 28 |

EXAMPLES 31 to 34

To 500 ml of a polytetrafluoroethylene emulsion having a polymer content of 10 percent by weight were added 3.98 g of

preliminarily dispersed in 46.02 g of $H_2O$. After gentle stirring, there were drawn from this mixture five portions of 45 ml each. To each of these portions of treated emulsion there was added an amount of $Th(NO_3)_4 \cdot 4H_2O$ as indicated in Table 2, and the volume of each portion was then brought up to 50 ml with distilled water. After a short stirring, the portions were allowed to stand for a time. From these portions were then obtained, in the times indicated, concentrated polytetrafluoroethylene emulsions, the concentrations also being indicated in Table 2.

TABLE 2

| $Th(NO_3)_4 \cdot 4H_2O$ (grams) | Standing Time (hours) | Final concentration of emulsion (% by weight) |
|---|---|---|
| 6.95 | 125 | 43 |
| 2.24 | 125 | 36 |
| 0.54 | 45 | 31 |
| 0.27 | 45 | 31 |

Variations can of course be made without departing from the spirit and scope of the invention.

Having thus described our invention, what we desire to secure by Letters Patent and hereby claim is:

1. An aqueous emulsion consisting essentially of solid polytetrafluoroethylene, water and the surfactant employed in the emulsion polymerization phase, said emulsion having added thereto a stabilizing amount, at least about 0.001 mole per 100 grams of said polytetrafluoroethylene, of a perfluoroketoether having the formula,

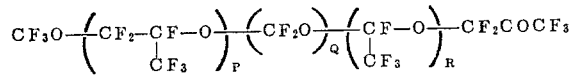

the different perfluoroalkylene units having a random distribution along the polymer chain; and wherein P is zero or an integer from 1 to 5;

Q and R are each zero, 1 or 2; and the sum of P+Q+R is either zero or an integer from 1 to 7.

2. The aqueous polytetrafluoroethylene emulsion of claim 1, which contains the perfluoroketoether in an amount between about 0.001 and 0.1 mole per 100 grams of polymer.

3. The aqueous polytetrafluoroethylene emulsion of claim 2, wherein the amount of perfluoroketoether is between about 0.005 and 0.060 moles per 100 grams of polymer.

4. The aqueous polytetrafluoroethylene emulsion of claim 1, which has a polytetrafluoroethylene concentration in excess of 20 percent by weight of said emulsion.

5. The aqueous polytetrafluoroethylene emulsion of claim 1, which has a polytetrafluoroethylene concentration of from about 10 to 18 percent by weight of said emulsion.

6. The aqueous polytetrafluoroethylene emulsion of claim 3, which has a polytetrafluoroethylene concentration in excess of 20 percent by weight of said emulsion.

7. A process for the preparation of a concentrated aqueous polytetrafluoroethylene emulsion which comprises first adding to a dilute aqueous emulsion consisting essentially of solid polytetrafluoroethylene, water and the surfactant employed in the emulsion polymerization phase, at least about 0.001 mole per 100 grams of said polytetrafluoroethylene of a perfluoroketoether having the formula:

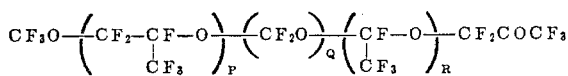

the different perfluoroalkylene units having a random distribution along the polymer chain; and wherein P is zero or an integer from 1 to 5;

Q and R are each zero, 1 or 2; and the sum of P+Q+R is either zero or an integer from 1 to 7; thereafter adding to the resulting emulsion an ionic agent selected from the group consisting of HCl, NaCl, $NH_4Cl$, $NaNO_3$, $NH_4NO_3$, $CdSO_4$ and $Th(NO_3)_4$, allowing the resulting mixture to stand, whereby to permit spontaneous separation thereof into a substantially polymer-free upper aqueous layer and a lower layer which comprises a more concentrated polytetrafluoroethylene emulsion, and then separating said layers whereby to recover said concentrated emulsion.

8. The process of claim 7 wherein said perfluoroketoether is dispersed in water prior to the addition thereof to said dilute emulsion.

9. The process of claim 7 wherein said ionic agent is dissolved in water prior to the addition thereof to said dilute emulsion.

10. The process of claim 7 wherein the amount of said perfluoroketoether added to said emulsion is from about 0.005 to 0.030 moles of perfluoroketoether per 100 grams of polymer.

11. The process of claim 7 wherein the amount of said ionic agent added to said emulsion is from about 0.01 to 6 moles of ionic agent per liter of emulsion.

12. The process of claim 7 wherein the concentration of polytetrafluoroethylene in said dilute aqueous emulsion is from about 10 to about 18% by weight of said emulsion.

13. The process of claim 12 wherein said dilute emulsion is obtained directly from the emulsion polymerization of tetrafluoroethylene.

* * * * *

PO-1050
(5/69)

UNITED STATES PATENT OFFICE
CERTIFICATE OF CORRECTION

Patent No. 3,755,235            Dated August 28, 1973

Inventor(s) Dario Sianesi, Giancarlo Bernardi and Gianfranco Veroli

It is certified that error appears in the above-identified patent and that said Letters Patent are hereby corrected as shown below:

Column 7, line 65: "spray gun, then" should read -- spray gun, and then --. Column 8, line 16: "300 go" should read -- 300 g. --.

Signed and sealed this 5th day of March 1974.

(SEAL)
Attest:

EDWARD M. FLETCHER, JR.           C. MARSHALL DANN
Attesting Officer                 Commissioner of Patents